US012791868B2

(12) United States Patent
Lim et al.

(10) Patent No.: US 12,791,868 B2
(45) Date of Patent: Nov. 10, 2026

(54) CAMERA MODULE

(71) Applicant: SAMSUNG ELECTRO-MECHANICS CO., LTD., Suwon-si (KR)

(72) Inventors: Soo Cheol Lim, Suwon-si (KR); Sang Hun Han, Suwon-si (KR); Jae Ho Baik, Suwon-si (KR); Ik Sun Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 672 days.

(21) Appl. No.: 17/848,856

(22) Filed: Jun. 24, 2022

(65) Prior Publication Data

US 2023/0012973 A1 Jan. 19, 2023

(30) Foreign Application Priority Data

Jul. 14, 2021 (KR) ........................ 10-2021-0092438

(51) Int. Cl.

*G02B 27/64* (2006.01)
*G03B 5/02* (2021.01)
*G03B 5/04* (2021.01)

(52) U.S. Cl.

CPC ............. *G02B 27/646* (2013.01); *G03B 5/02* (2013.01); *G03B 5/04* (2013.01); *G03B 2205/0015* (2013.01); *G03B 2205/0038* (2013.01)

(58) Field of Classification Search

CPC .......... G02B 27/646; G03B 5/00; G03B 5/02; G03B 5/04; G03B 17/12; G03B 30/00; G03B 2205/0007; G03B 2205/0015; G03B 2205/0038; H04N 23/55; H04N 23/57; H04N 23/687

See application file for complete search history.

(56) References Cited

U.S. PATENT DOCUMENTS 8,861,946 B2 * 10/2014 Kim ..................... G02B 27/646 396/55
2008/0085108 A1 4/2008 Sekino et al.
2010/0328791 A1 * 12/2010 Jung ...................... G03B 17/02 359/823

(Continued)

FOREIGN PATENT DOCUMENTS

CN 101162345 A 4/2008
CN 110692004 A 1/2020

(Continued)

OTHER PUBLICATIONS

Korean Office Action issued on Jan. 11, 2023, in counterpart Korean Patent Application No. 10-2021-0092438 (7 pages in English, 5 pages in Korean).

(Continued)

*Primary Examiner* — Ricky L Mack
*Assistant Examiner* — Natasha Nigam
(74) *Attorney, Agent, or Firm* — NSIP Law

(57) ABSTRACT

A camera module is provided. The camera module includes a carrier; a lens holder accommodated in the carrier; an optical image stabilization (OIS) cover coupled to the carrier and disposed on the lens holder; and first buffer members coupled to the OIS cover, wherein a distance between the lens holder and the first buffer member is less than a distance between the lens holder and the OIS cover.

20 Claims, 10 Drawing Sheets

(56) References Cited

U.S. PATENT DOCUMENTS

| | | | | |
|---|---|---|---|---|
| 2013/0010378 | A1* | 1/2013 | Wang | H02K 41/0356 310/12.04 |
| 2013/0209080 | A1 | 8/2013 | Lee | |
| 2014/0204467 | A1 | 7/2014 | Hsiao et al. | |
| 2015/0296143 | A1 | 10/2015 | Kang et al. | |
| 2015/0346587 | A1 | 12/2015 | Lim et al. | |
| 2020/0249424 | A1* | 8/2020 | Ho | H02K 41/0356 |
| 2021/0048730 | A1* | 2/2021 | Jeong | G02B 27/646 |
| 2022/0066290 | A1* | 3/2022 | Kim | G03B 13/36 |
| 2022/0163089 | A1* | 5/2022 | Kim | G03B 5/00 |
| 2022/0385136 | A1* | 12/2022 | Wu | G03B 13/34 |
| 2023/0176318 | A1* | 6/2023 | Lee | H04N 23/687 359/824 |
| 2023/0314832 | A1* | 10/2023 | Shikama | G03B 13/36 |

FOREIGN PATENT DOCUMENTS

| | | | | | |
|---|---|---|---|---|---|
| JP | 5449491 | B1 | | 1/2014 | |
| JP | 2014-142640 | A | | 8/2014 | |
| KR | 10-2013-0091897 | A | | 8/2013 | |
| KR | 10-2015-0118008 | A | | 10/2015 | |
| KR | 10-2015-0138034 | A | | 12/2015 | |
| KR | 10-2018-0023336 | A | | 3/2018 | |
| KR | 20180023336 | A | * | 3/2018 | G03B 3/10 |
| KR | 10-2021-0014301 | A | | 2/2021 | |
| KR | 20210014301 | A | * | 2/2021 | H04N 23/60 |

OTHER PUBLICATIONS

Chinese Office Action issued on Nov. 29, 2025 in corresponding Chinese Patent Application No. 202210811377.X (6 pages in English and 10 pages in Chinese).

* cited by examiner

CAMERA MODULE

CROSS-REFERENCE TO RELATED APPLICATIONS

This application claims the benefit under 35 USC § 119(a) of Korean Patent Application No. 10-2021-0092438, filed on Jul. 14, 2021, in the Korean Intellectual Property Office, the entire disclosure of which is incorporated herein by reference for all purposes.

BACKGROUND

1. Field

The following description relates to a camera module.

2. Description of Related Art

Mobile electronic devices such as smartphones and tablet personal computers (PCs) are widely used. Such mobile electronic devices may have a form factor that has a low thickness to improve portability. Additionally, in accordance with the explosive growth of the personal media market, examples of capturing images with mobile devices have increased.

However, unless a user implements special equipment to take a photograph or capture an image through a smartphone, the captured image may have increased shake, or the outline of a subject, in an example of a still image, may be blurred, due to user's movement (e.g., hand-shake, walking or running).

Various technologies are implemented in order to correct such hand-shake. For example, the hand-shake may be corrected by post-processing the captured image by software, or by moving a lens or an image sensor of a camera module. When the image is corrected by software, a mechanical structure is simple, but there may be a problem that an angle of view is narrowed because a portion of the image is cut out in-when the image is processed. An optical image stabilization method of correcting the hand-shake by moving the image sensor or the lens is structurally complicated because a driving actuator may be used, but may have an advantage in terms of angle of view.

In order to correct greater hand-shake, a movement range of the lens or the image sensor should be greater. In an example, when a lens barrel moves in a direction perpendicular to an optical axis to correct a shake of the camera module, as a distance that the lens barrel may move increases, a degree of correction for the shake increases.

However, as a movable range of a movable body (e.g., a lens barrel) increases, an amount of impact generated when the movable body collides with a fixed body (e.g., a case accommodating the lens barrel therein) increases, and accordingly, noise, for example, rattling noise, may be generated or internal components of the camera module may be damaged. Therefore, a method that alleviates the amount of impact or the noise increasing in accordance with the increase in the movable range of the movable body is beneficial.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a camera module includes a carrier; a lens holder accommodated in the carrier; an optical image stabilization (OIS) cover coupled to the carrier, and disposed on the lens holder; and first buffer members coupled to the OIS cover, wherein a distance between the lens holder and the first buffer members is less than a distance between the lens holder and the OIS cover.

The camera module may include second buffer members disposed on the lens holder and may be configured to contact the carrier based on a movement of the lens holder in directions perpendicular to an optical axis.

The carrier may include sidewalls which face the lens holder in the directions perpendicular to the optical axis, and the second buffer members may be disposed between the sidewalls and the lens holder.

The second buffer members may be disposed on corner portions of the lens holder.

The second buffer members may be configured to contact the carrier based on a movement of the lens holder in at least one of a first direction perpendicular to the optical axis and a second direction perpendicular to both the optical axis and the first direction.

The lens holder may include insertion members at least partially inserted in the lens holder, and the second buffer members are disposed on the insertion members.

The camera module may include a housing configured to accommodate the carrier therein; a shield case, coupled to the housing, and configured to cover an upper portion of the carrier; and third buffer members disposed on the OIS cover and configured to contact the shield case based on a movement of the carrier in an optical axis direction with respect to the housing.

The first buffer member may be formed integrally with the third buffer member.

The camera module may include fourth buffer members disposed on a lower portion of the carrier and configured to contact a bottom of the housing.

The camera module may include an OIS guide disposed between the lens holder and the carrier; first ball members disposed between the OIS guide and the carrier; first guide grooves in contact with the first ball members and extending in a first direction perpendicular to an optical axis; second ball members disposed between the OIS guide and the lens holder; and second guide grooves in contact with the second ball members and extending in a second direction perpendicular to the optical axis and crossing the first direction.

The camera module may include third ball members disposed between the carrier and the housing; and third guide grooves in contact with the third ball members and extending in the optical axis direction.

In a general aspect, a camera module includes a housing; a carrier accommodated in the housing and configured to move in an optical axis direction; a lens holder accommodated in the carrier; and second buffer members disposed on the lens holder and configured to face sidewalls of the carrier in directions perpendicular to an optical axis.

The second buffer members may be configured to contact the carrier based on a movement of the lens holder in at least one of a first direction perpendicular to the optical axis and a second direction perpendicular to both the optical axis and the first direction.

The lens holder may include insertion members at least partially inserted in the lens holder, and the second buffer members are disposed on the insertion members.

The camera module may include a shield case coupled to the housing and configured to cover an upper portion of the carrier; and third buffer members configured to contact the shield case based on a movement of the carrier in the optical axis direction with respect to the housing.

In a general aspect, a camera module includes a carrier; an optical image stabilization (OIS) movable body, configured to move in an optical axis direction; an OIS cover; and first dampers disposed on a lower surface of the OIS cover, and configured to protrude toward an upper surface of the OIS movable body; wherein the OIS movable body is configured to contact the dampers when the OIS movable body moves from the carrier to the OIS cover in the optical axis direction.

The camera module may include second dampers disposed on side surfaces of the OIS movable body between the OIS movable body and the carrier.

The second dampers are configured to face the carriers in a first direction perpendicular to an optical axis direction and a second direction perpendicular to the optical axis direction.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
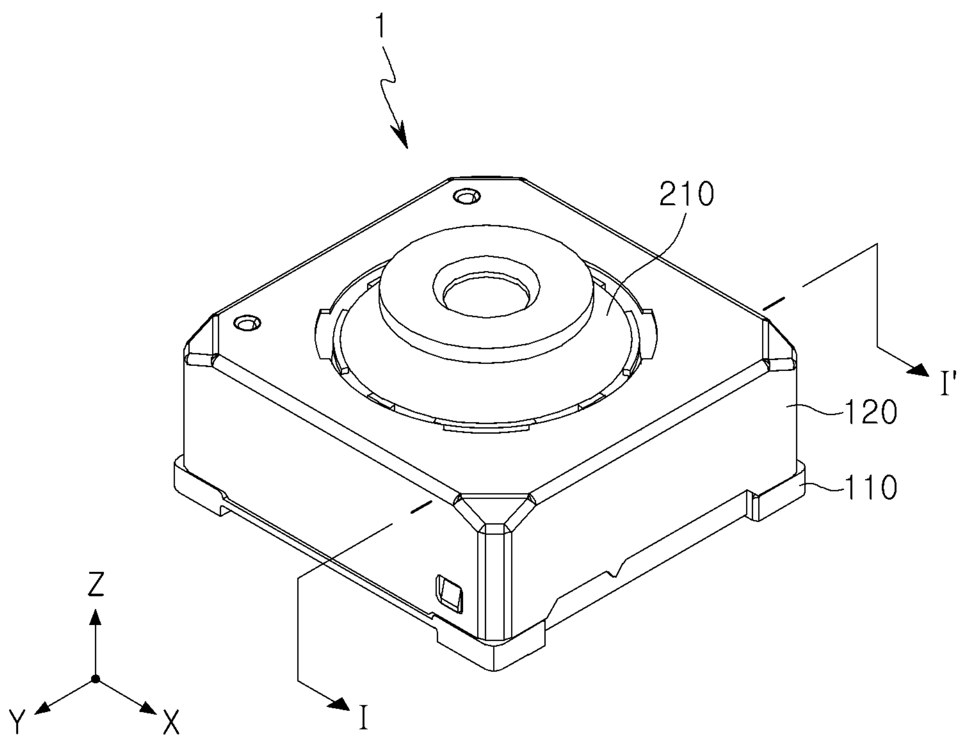
FIG. 1 illustrates a perspective view of an example camera module, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof.

In addition, terms such as first, second, A, B, (a), (b), and the like may be used herein to describe components. Each of these terminologies is not used to define an essence, order, or sequence of a corresponding component but used merely to distinguish the corresponding component from other component(s).

Unless otherwise defined, all terms, including technical and scientific terms, used herein have the same meaning as commonly understood by one of ordinary skill in the art to which this disclosure pertains and after an understanding of the disclosure of this application. Terms, such as those defined in commonly used dictionaries, are to be interpreted as having a meaning that is consistent with their meaning in the context of the relevant art and the disclosure of this application, and are not to be interpreted in an idealized or overly formal sense unless expressly so defined herein.

Also, in the description of example embodiments, detailed description of structures or functions that are thereby known after an understanding of the disclosure of the present application will be omitted when it is deemed that such description will cause ambiguous interpretation of the example embodiments.

An X-direction, a Y-direction, and a Z-direction used herein may refer to a direction parallel to an X axis, a direction parallel to a Y axis, and a direction parallel to a Z axis illustrated in the drawings, respectively. Additionally, unless otherwise described, the X-direction conceptually includes both the +X-axis direction and the −X-axis direction, which also applies to the Y-direction and the Z-direction.

The one or more examples relate to a small camera module that provides an optical image stabilization (OIS) function.

Figure 2:
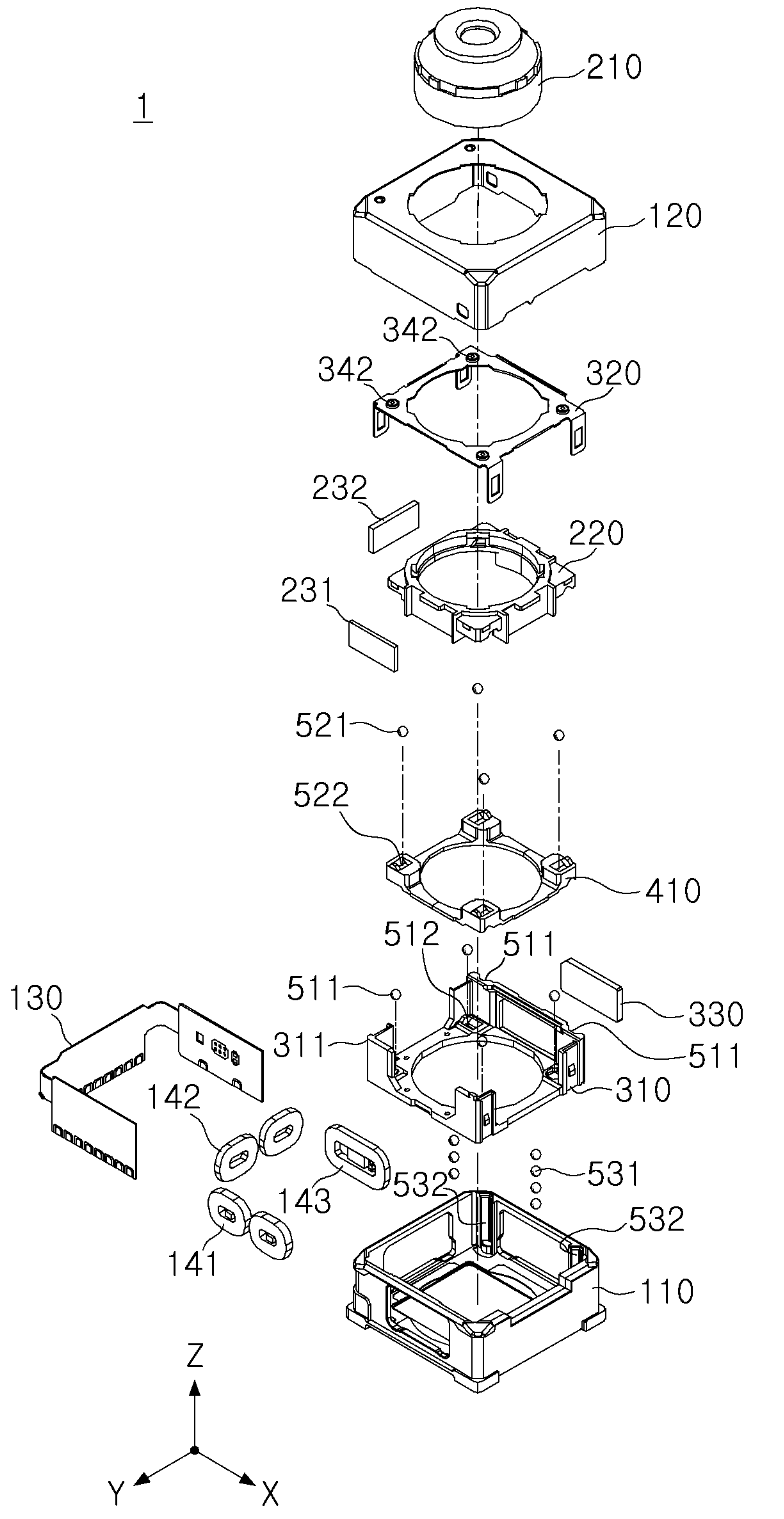
FIG. 2 illustrates an exploded perspective view of an example camera module, in accordance with one or more embodiments.

FIG. 1 illustrates a perspective view of an example camera module 1, in accordance with one or more embodiments. FIG. 2 illustrates an exploded perspective view of the example camera module 1, in accordance with one or more embodiments.

Referring to FIGS. 1 and 2, the camera module 1 may include a housing 110, a lens assembly 210 accommodated in the housing 110, and an image sensor (not illustrated) disposed below the lens assembly 210. The camera module 1 may include a shield case 120 at least partially surrounding side surfaces and an upper portion of the housing 110. The shield case 120 may prevent, or significantly decrease, an effect of an electromagnetic field outside the camera module 1 on a magnetic field (coils or magnets constituting an autofocus (AF) driving unit or an optical image stabilization (OIS) driving unit) inside the shield case 120.

The camera module 1 may provide an optical image stabilization (hereinafter, referred to as 'OIS') function by moving the lens assembly 210 in directions perpendicular to an optical axis with respect to the image sensor.

In an example, the lens assembly 210 may be accommodated in an AF carrier 310, and may move in directions (e.g., an X-axis direction and a Y-axis direction) perpendicular to the optical axis when accommodated inside the AF carrier 310. In an example, the camera module 1 may include an OIS driving unit configured to drive a lens holder 220 coupled to the lens assembly 210 in directions perpendicular to the optical axis with respect to the AF carrier 310.

In an example, the OIS driving unit may include OIS magnets 231 and 232 mounted on the lens holder 220, and OIS coils 141 and 142 that face the OIS magnets 231 and 232, respectively, and provided on the housing 110. The lens holder 220 may move in directions perpendicular to the optical axis with respect to the AF carrier 310 (or the housing 110) by an electromagnetic interaction between the OIS coils 141 and 142 and the OIS magnets 231 and 232.

In accordance with one or more embodiments, the OIS driving unit may drive the lens holder 220 in two directions perpendicular to the optical axis, for example, an X-axis direction and a Y-axis direction. The OIS driving unit may include a first OIS driving unit that drives the lens holder 220 in a first direction and a second OIS driving unit that drives the lens holder 220 in a second direction. In an example, both the first direction and the second direction may be perpendicular to the optical axis, and may cross each other. In an example, the first direction and the second direction may be the X-axis direction and the Y-axis direction, respectively.

The first OIS driving unit may include a first OIS magnet 231 and first OIS coils 141 that face the first OIS magnet 231. The second OIS driving unit may include a second OIS magnet 232 and second OIS coils 142 that faces the second OIS magnet 232. The OIS coils 141 and 142 may be attached to a substrate 130 mounted on the housing 110.

The first OIS magnet 231 and the second OIS magnet 232 may be mounted on the lens holder 220, and may be disposed to face different directions. In an example, the first OIS magnet 231 may be disposed to face the X-direction, and the second OIS magnet 232 may be disposed to face the Y-direction.

The first OIS magnet 231 and the second OIS magnet 232 may be disposed to face a +Y-direction and a −X-direction, respectively, in the illustrated example, but positions of the first OIS magnet 231 and the second OIS magnet 232 are not limited to those of the illustrated example, and the first OIS magnet 231 and the second OIS magnet 232 may be variously disposed. In an example, both the first OIS magnet 231 and the second OIS magnet 232 may be disposed to face the same direction. In another example, the first OIS magnet 231 and the second OIS magnet 232 may be disposed to face each other in opposite directions.

In the illustrated example, the OIS magnets 231 and 232 may be coupled to the lens holder 220, and the OIS coils 141 and 142 may be coupled to the housing 110, but this is only an example, and in another example, the OIS coil 141 and 142 may be coupled to the lens holder 220 and the OIS magnets 231 and 232 may be coupled to the housing 110 (or the AF carrier 310).

In the illustrated example, the OIS coils 141 and 142 may be coupled to the housing 110, but this is only an example, and in another example, the OIS coils 141 and 142 may be coupled to the AF carrier 310.

In an example, the camera module 1 may include an OIS guide 410 disposed between the lens holder 220 and the AF carrier 310.

In an example, first ball members 511 may be disposed between the AF carrier 310 and the OIS guide 410, and the AF carrier 310 and/or the OIS guide 410 may include first guide grooves 512 in the first direction. The first ball members 511 may restrict relative movement between the AF carrier 310 and the OIS guide 410 in the first direction while moving along the first guide groove 512. The first direction may be a direction perpendicular to the optical axis.

In an example, when the first guide grooves 512 extend in the X-direction, the relative movement between the AF carrier 310 and the OIS guide 410 may be limited in the X-direction.

In an example, second ball members 521 may be disposed between the lens holder 220 and the OIS guide 410, and the lens holder 220 and/or the OIS guide 410 may include second guide grooves 522 extending in the second direction. The second ball members 521 may restrict relative movement between the lens holder 220 and the OIS guide 410 in the second direction while moving along the second guide grooves 522. In an example, the second direction may be perpendicular to the optical axis, and may cross the first direction in which the first guide grooves 512 extend.

In an example, the first guide grooves 512 may extend in the X-direction, and the second guide grooves 522 may extend in the Y-direction. In this example, relative movement between the lens holder 220 and the second guide grooves 522 may be limited in the Y-direction. Although not illustrated, in another example, the first guide grooves 512 may extend in the Y-direction, and the second guide grooves 522 may extend in the X-direction. In this example, relative movement between the lens holder 220 and the second guide grooves 522 may be limited in the X-direction.

The camera module 1 may provide an autofocus (hereinafter, 'AF') function by adjusting a distance between the image sensor and the lens assembly 210 in an optical axis direction.

In an example, the lens assembly 210 may be carried on the AF carrier 310 to move in the optical axis direction (i.e., the Z-direction) with respect to the housing 110.

In an example, the camera module 1 may include an AF driving unit that moves the AF carrier 310 in the optical axis direction with respect to the housing 110. In an example, the AF driving unit may include an AF magnet 330 mounted on the AF carrier 310 and an AF coil 143 facing the AF magnet 330 and mounted on the housing 110. In an example, the AF magnet 330 may be mounted on the housing 110 and the AF coil 143 may be mounted on the AF carrier 310. As a current flows in the AF coil 143, the AF coil 143 and the AF magnet 330 may electromagnetically interact to drive the AF carrier 310 in the optical axis direction with respect to the housing 110.

In an example, third ball members 531 may be disposed between the AF carrier 310 and the housing 110, and the AF carrier 310 or the housing 110 may be provided with third guide grooves 532 in contact with the third ball members 531, and may extend in the optical axis direction. A cross section of the third guide groove 532 (a surface cut by a plane perpendicular to an extension direction of the third guide groove) may be provided in various shapes such as a V shape, a half-pipe (half-pipe) shape, and a rectangular shape. When the third guide groove 532 is provided in the V shape, the third guide groove 532 may be in contact with the third ball member 531 at two points. In another example, when the third guide groove 532 is provided in the rectangular shape, the third guide groove 532 may contact the third ball member 531 at one point.

Figure 3:
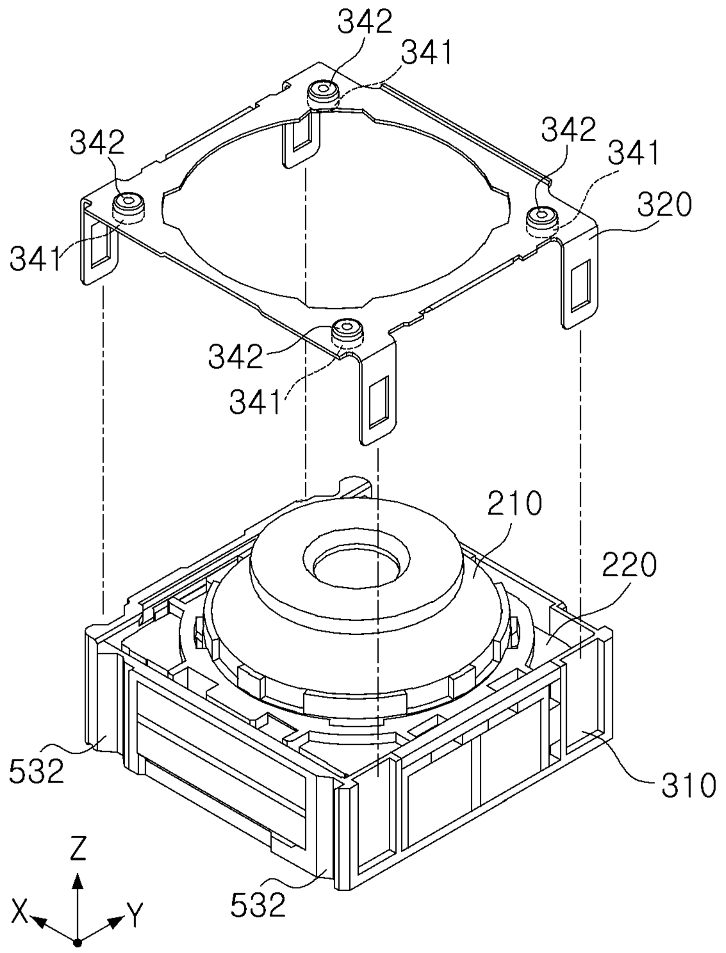
FIG. 3 illustrates a view illustrating that an optical image stabilization (OIS) cover is separated from an autofocus (AF) carrier, in accordance with one or more embodiments.
Figure 4:
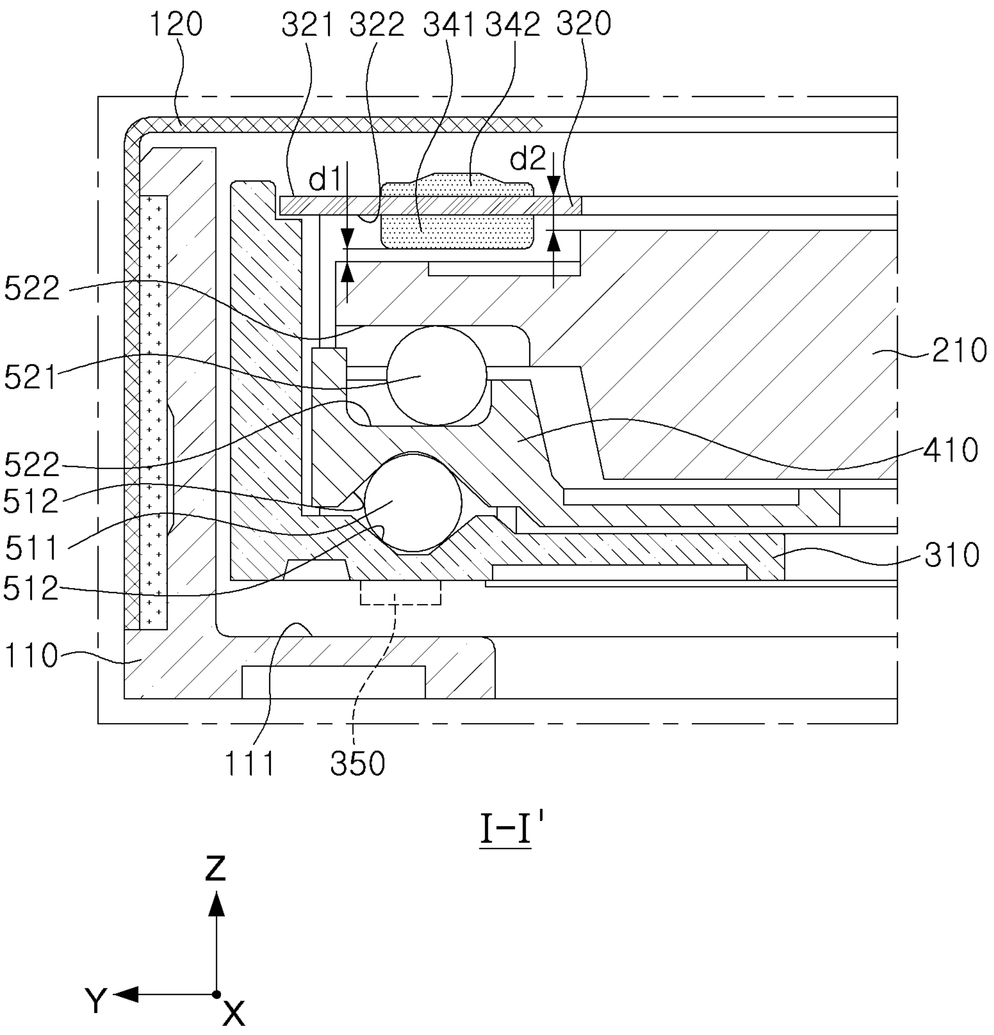
FIG. 4 illustrates a cross-sectional view taken along line I-I' of FIG. 1.
Figure 5:
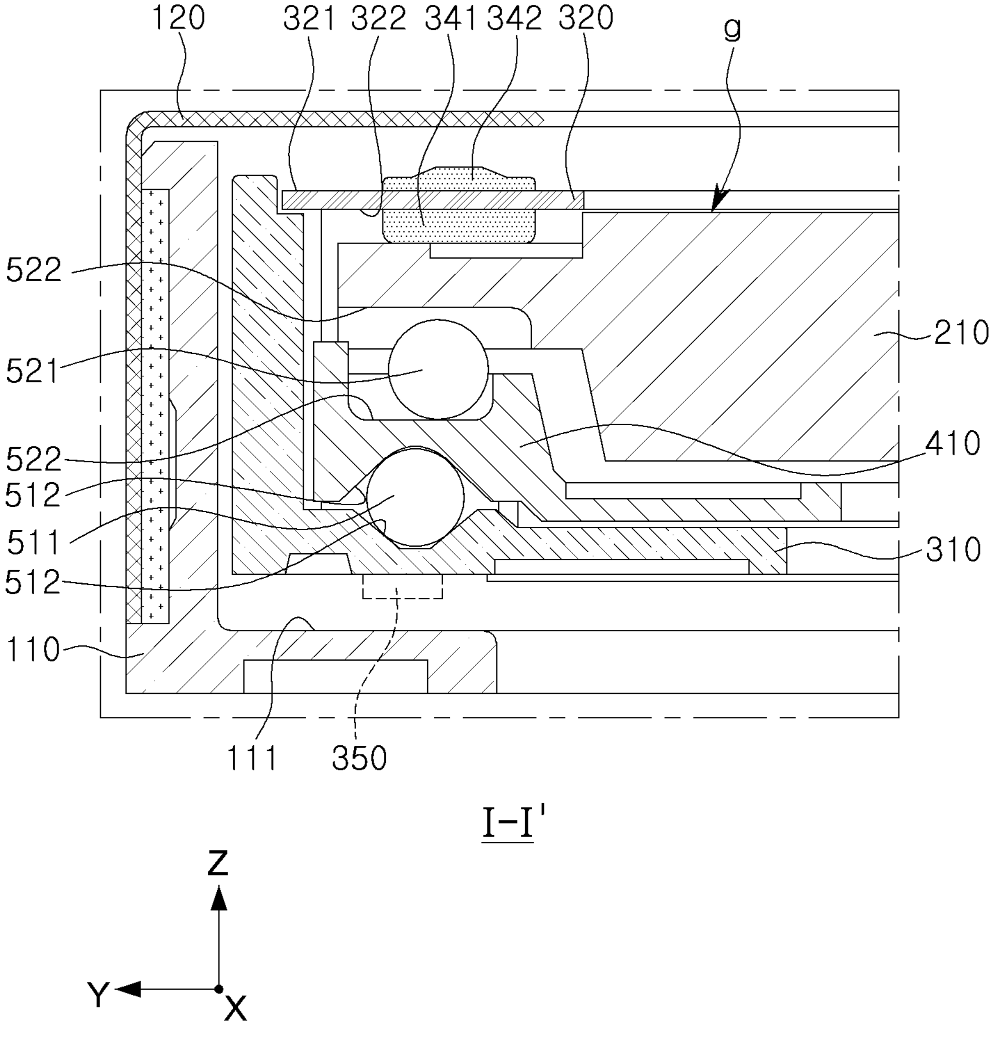
FIG. 5 illustrates a cross-sectional view taken along line I-I' of FIG. 1 when a lens holder is in contact with a first buffer member, in accordance with one or more embodiments.

FIG. 3 is a view illustrating that an OIS cover is separated from an AF carrier in an example. FIG. 4 is a cross-sectional view taken along line I-I' of FIG. 1. FIG. 5 is a cross-sectional view taken along line I-I' of FIG. 1 when a lens holder 220 is in contact with a first buffer member in an example.

Referring to FIGS. 3 and 4, an OIS movable body including the lens assembly 210 and the lens holder 220 may move in directions perpendicular to the optical axis inside the AF carrier 310. The OIS movable body may further include a component that moves together with the lens assembly 210, in addition to the lens assembly 210 and the lens holder 220. The AF carrier 310 may be provided in the form of a square box with an open upper portion, and an OIS cover 320 may cover an upper portion of the AF carrier 310 to prevent the OIS movable body from being ejected from the AF carrier 310.

In order to smoothly perform the OIS function, the OIS movable body may receive a force that pulls the OIS movable body in a direction toward a bottom surface of the AF carrier 310 (that is, in a −Z-direction). In an example, although not illustrated, yokes facing the OIS magnets 231 and 232 in the optical axis direction may be disposed on the bottom surface of the AF carrier 310. Pulling forces may be generated between the OIS magnets 231 and 232 and the yokes, and the OIS movable body may be pulled to the bottom surface of the AF carrier 310. Accordingly, contact between the first ball members 511 and the AF carrier 310 and the OIS guide 410 disposed on both sides of the first ball members 511, respectively, may be continuously maintained. Additionally, contact between the second ball members 521 and the lens holder 220 and the OIS guide 410 disposed on both sides of the second ball members 521, respectively, may be continuously maintained. That is, an interval between the bottom surface of the AF carrier 310 and the OIS movable body may be constantly maintained.

However, when a relatively strong hand-shake or impact occurs, an interval or distance between the lens holder 220 and the bottom surface of the AF carrier 310 may be widened. In this example, the OIS movable body may collide with the OIS cover 320. In an example, the camera module 1 may include first buffer member or damper 341 as a unit that alleviates noise generated while the OIS movable body collides with the OIS cover 320.

Referring to FIGS. 4 and 5, the first buffer members 341 may be disposed on the OIS cover 320. In an example, the first buffer member 341 may include a material that absorbs impact or allows the impact to be slowly transferred. In an example, the first buffer member or damper 341 may include a material such as, but not limited to, silicone, rubber, urethane, or sponge. The same goes for a second buffer member or damper 240, a third buffer member or damper 342, and a fourth buffer member or damper 350 to be described later.

In an example, the OIS movable body may collide with the first buffer members 341 instead of the OIS cover 320. The shortest distance d1 between a surface, for example, an upper surface, of the OIS movable body and the OIS cover 320 in the optical axis direction may be less than the shortest optical axis distance d2 between the surface of the OIS movable body and the first buffer member 341 in the optical axis direction. Referring to FIG. 5, an air gap g may exist between the OIS movable body and the OIS cover 320 when the OIS movable body is in contact with the first buffer member 341. In an example, the air gap g may be formed in the optical axis direction (Z axis direction) between the lens holder 220 and a rear surface 322 of the OIS cover 320 when the OIS movable body is in contact with the first buffer member 341.

Although not illustrated, in an example, the first buffer members 341 may be disposed on the OIS movable body instead of the OIS cover 320. In an example, the first buffer members 341 may be attached to an upper portion of the lens holder 220, and may move together with the OIS movable body. In this example, when the OIS movable body moves in a +Z-direction, the first buffer members 341 may alleviate impact while colliding with the OIS cover 320.

In the one or more examples, the OIS movable body may be referred to as a lens holder 220. In an example, a description that the lens holder 220 may collide with the OIS cover 320 or the first buffer members 341 may mean that the OIS movable body collides with the OIS cover 320 or the first buffer members 341.

Figure 6:
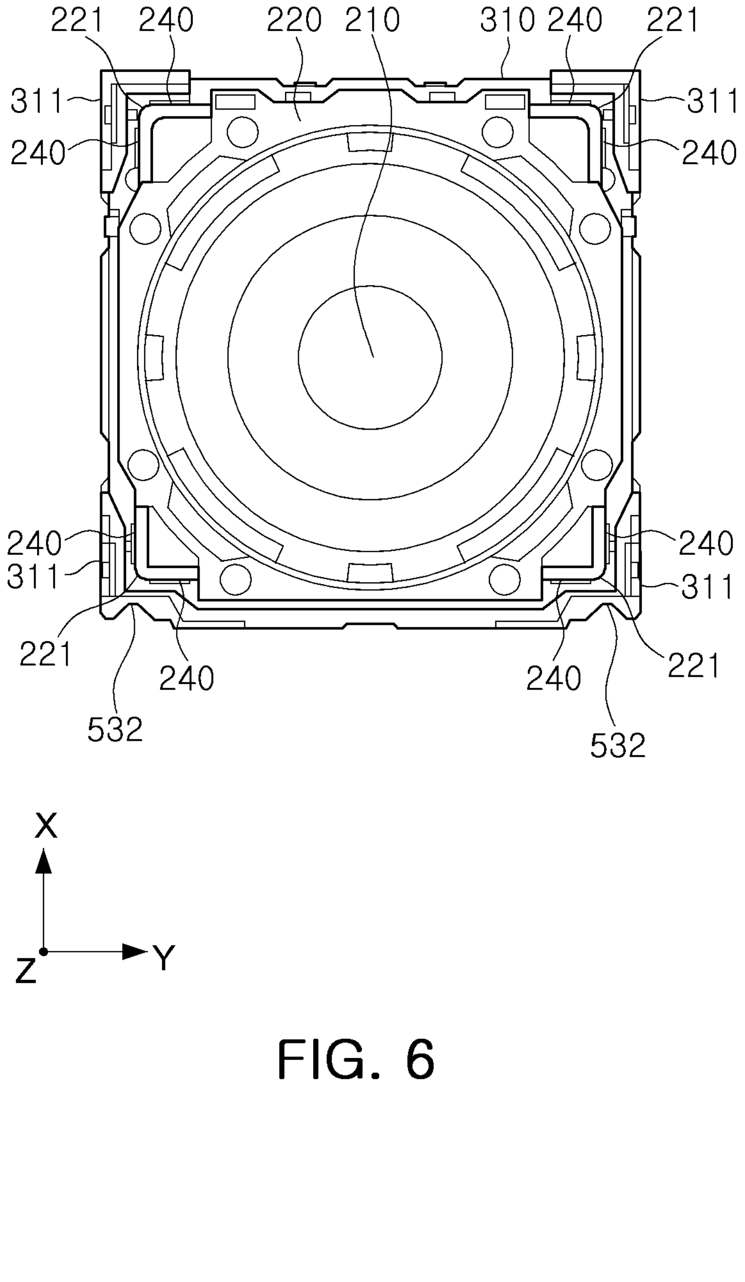
FIG. 6 illustrates a view of an example lens holder accommodated in an AF carrier when viewed from an optical axis direction, in accordance with one or more embodiments.
Figure 7:
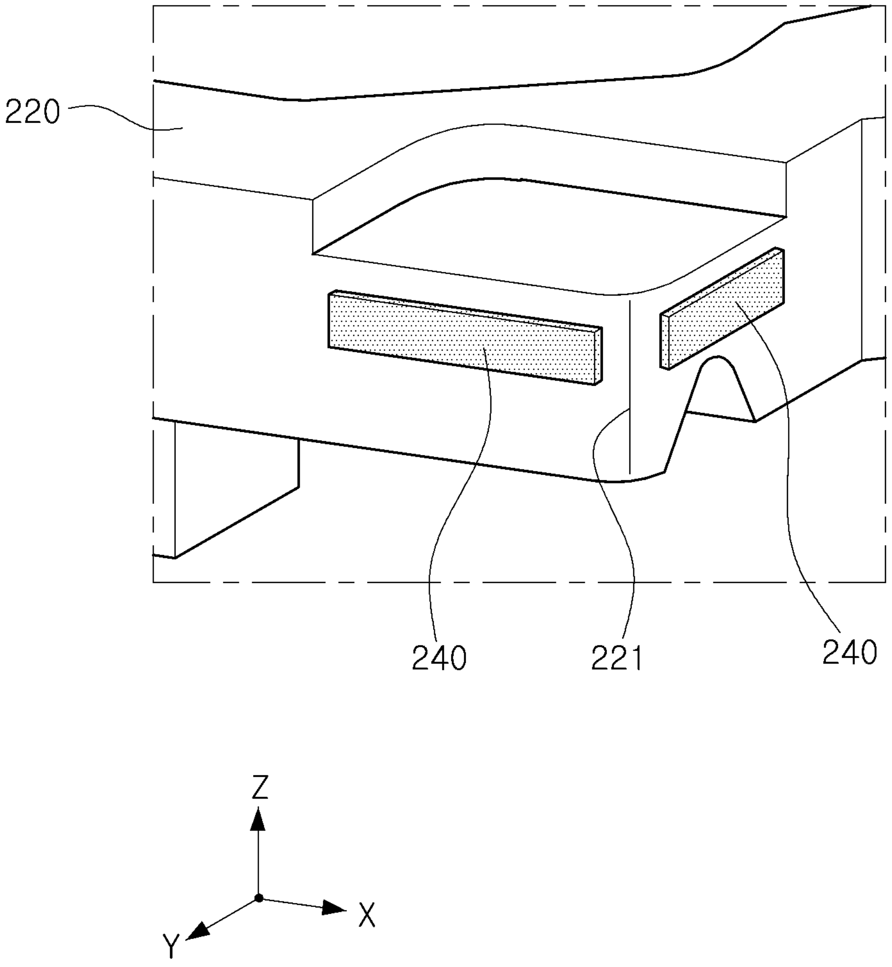
FIG. 7 illustrates a view of buffer members disposed on side surfaces of the lens holder, in accordance with one or more embodiments.
Figure 8:
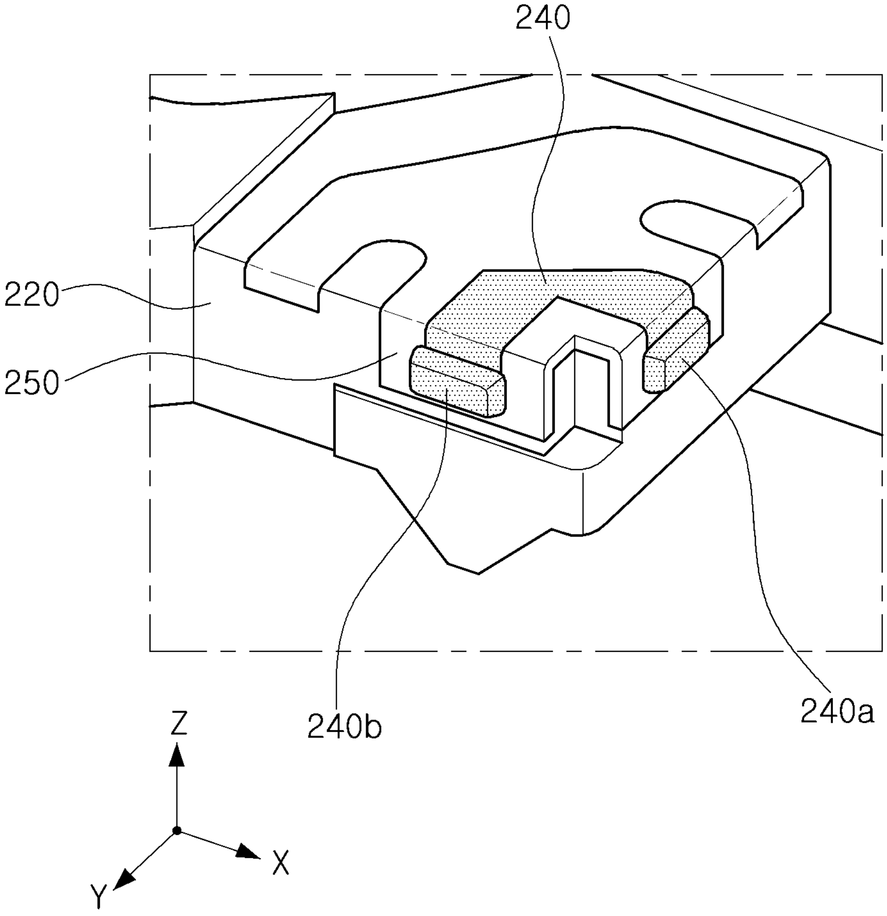
FIG. 8 illustrates a view illustrating that the buffer member is disposed on a first insertion member, in accordance with one or more embodiments.

FIG. 6 is a view illustrating an example lens holder 220 accommodated in the AF carrier 310, in accordance with one or more examples, when viewed from an optical axis direction. FIG. 7 is a view illustrating buffer members 240 disposed on side surfaces of the lens holder 220, in accordance with one or more embodiments. FIG. 8 is a view illustrating that the buffer member 240 is disposed on a first insertion member 250 in an example.

Referring to FIG. 6, clearances may exist in the directions perpendicular to the optical axis between the lens holder 220 and the AF carrier 310. The OIS function may be implemented by moving the lens holder 220 in a direction perpendicular to the optical axis inside the AF carrier 310.

In an example, second buffer members or dampers 240 may be disposed between the lens holder 220 and the AF carrier 310. In an example, the second buffer members 240 may be disposed on side surfaces of the lens holder 220, and when the lens holder 220 moves in directions perpendicular to the optical axis, the second buffer members 240 may come into contact with sidewalls 311 of the AF carrier 310. Although not illustrated, in another example, the second buffer members 240 may be disposed on the sidewalls 311 of the AF carrier 310.

Accordingly, although the lens holder 220 may be shaken in the directions perpendicular to the optical axis, noise or impact generated while the lens holder 220 collides with the sidewalls 311 of the AF carrier 310 may be alleviated.

Referring to FIGS. 6 through 8, in an example, the second buffer members 240 may be disposed at portions adjacent to corners 221 of the lens holder 220. In an example, the lens holder 220 may be provided in a substantially rectangular shape when viewed from the optical axis direction, and the second buffer members 240 may be disposed at portions adjacent to the corners 221 where the two sides meet. Referring to FIG. 6, the lens holder 220 may include four corners 221, and the second buffer members 240 may be disposed at portions adjacent to the respective corners 221. In an example, the second buffer member 240 may be disposed on each of a side surface extending from the corner 221 in the X-direction and a side surface extending from the corner 221 in the Y-direction.

In an example, the second buffer members 240 may be provided integrally with the lens holder 220. That is, the lens holder 220 may be provided in a manner in which the lens holder 220 itself includes the second buffer members 240 without the implementation of a separate manufacturing process of assembling the second buffer members 240 to the lens holder 220. In an example, the lens holder 220 may be manufactured by putting liquid-phase plastic in a mold and curing the liquid-phase plastic. In this example, the plastic may be introduced into the mold in a state in which the second buffer members 240 are positioned in the mold, and the second buffer members 240 may be firmly fixed to the lens holder 220 while the plastic hardens.

In an example, the second buffer member 240 may be attached to the lens holder 220 through the first insertion member 250. In an example, after the second buffer member 240 is attached to the first insertion member 250, the first insertion member 250 may be positioned in a mold to mold the lens holder 220. The liquid-phase plastic may at least partially surround the first insertion member 250, and the first insertion member 250 may be firmly fixed to the lens holder 220 while the plastic hardens.

Referring to FIG. 8, in an example, the second buffer member 240 may include a first part **240*a* and a second part 240*b* that extends from the first part 240*a*, and the first part 240*a* and the second part 240*b* may control collisions in different directions, respectively. In an example, the first part 240*a* may face the AF carrier 310 in the X-axis direction, and may alleviate impact between the AF carrier 310 and the lens holder 220 according to the movement of the lens holder 220 in the X-axis direction. The second part 240*b* may face the AF carrier 310 in the Y-axis direction, and may alleviate impact between the AF carrier 310 and the lens holder 220 according to the movement of the lens holder 220** in the Y-axis direction.

Figure 9:
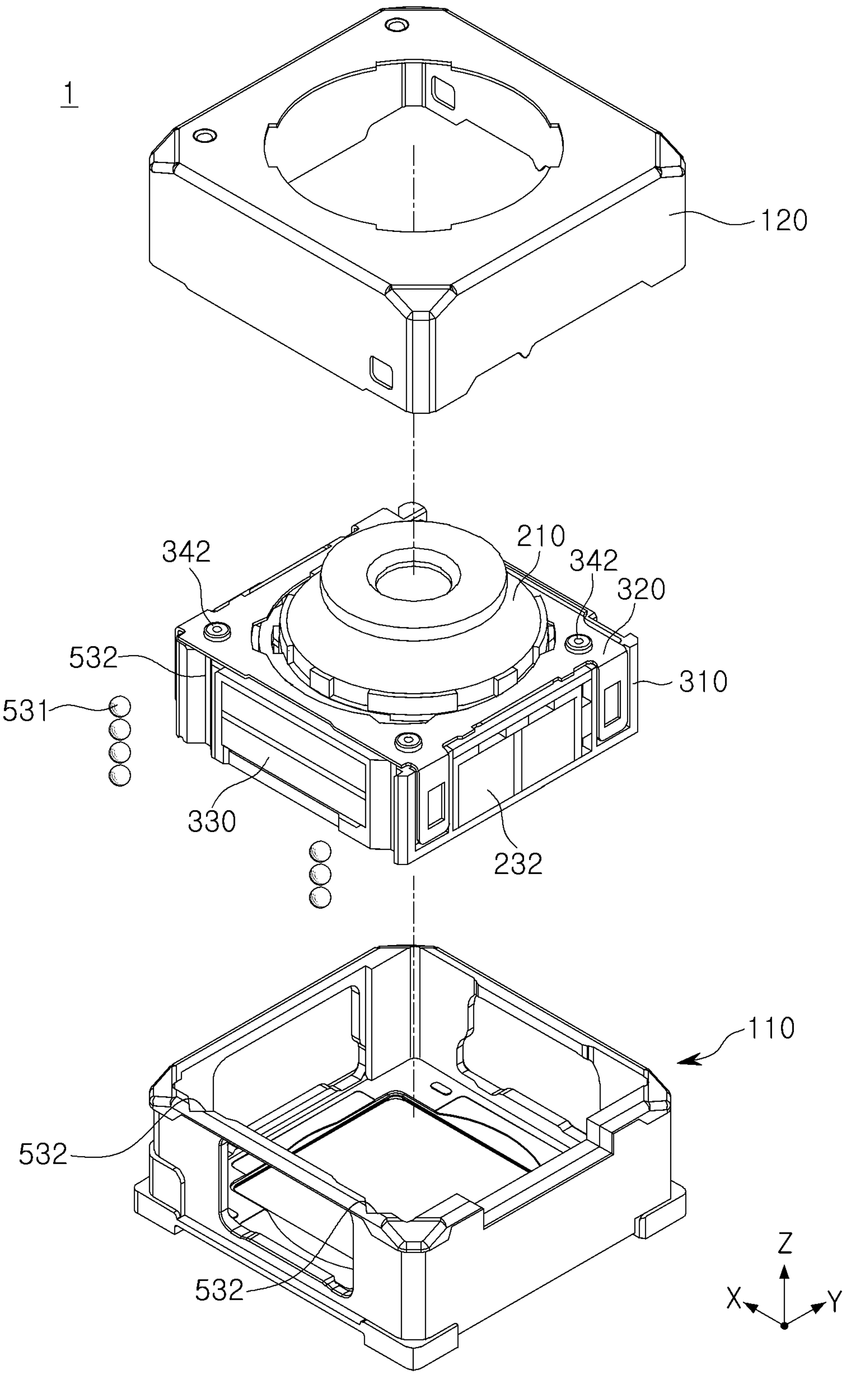
FIG. 9 illustrates a view illustrating that an autofocus (AF) movable body and a shield case are separated from a housing, in accordance with one or more embodiments.

FIG. 9 is a view illustrating that an autofocus AF movable body and a shield case 120 are separated from a housing 110 in an example. The AF movable body may be an assembly that moves in the optical axis direction with respect to the housing 110, and may include, for example, at least the AF carrier 310 and the OIS cover 320 coupled to the AF carrier 310. The AF movable body may further include components (e.g., the lens assembly 210 and the lens holder 220) that move together with the AF carrier 310, in addition to the AF carrier 310.

Referring to FIG. 4, the AF movable body may move in a predetermined range in the optical axis direction in an internal space defined by the housing 110 and the shield case 120. While AF driving is performed, the AF movable body may be maintained at a specific position in the optical axis direction with respect to the housing 110 according to the interaction between the AF coil 143 and the AF magnet 330. However, in an example in which the AF driving is not performed, a force that fixes the position of the AF movable body in the optical axis direction may be absent or weak, and thus, the AF movable body may freely move in the optical axis direction inside the housing 110. In this example, rattling noise may be generated while the AF movable body collides with the housing 110 or the shield case 120. In an example where the camera module 1 is implemented in a portable device such as a smartphone, when a user shakes the portable device, noise may be generated, which may impair a high-quality feeling of the portable device or make the user anxious as to whether or not an abnormality has occurred in the portable device. Therefore, such noise should be removed or alleviated.

In an example, third buffer members 342 may be disposed above the AF movable body. In an example, the third buffer members 342 may be disposed on the OIS cover 320. The third buffer members 342 may alleviate impact and noise generated when the AF movable body collides with the shield case 120 while moving in the +Z-direction. In an example, the third buffer members 342 may include a plurality of buffer members. Referring to FIG. 3, four third buffer members 342 may be mounted on the OIS cover 320. However, this is only an example, and three or less, or three or more buffer members 342 may be mounted on the OIS cover 320.

In an example, the third buffer member 342 may be the same member as the first buffer member 341. Referring to FIG. 4, when one buffer member is installed on the OIS cover 320, a portion protruding from an upper surface 321 of the OIS cover 320 in the +Z-direction may function as the third buffer member 342, and a portion protruding from the rear surface 322 of the OIS cover 320 in the −Z-direction may function as the first buffer member 341.

Figure 10:
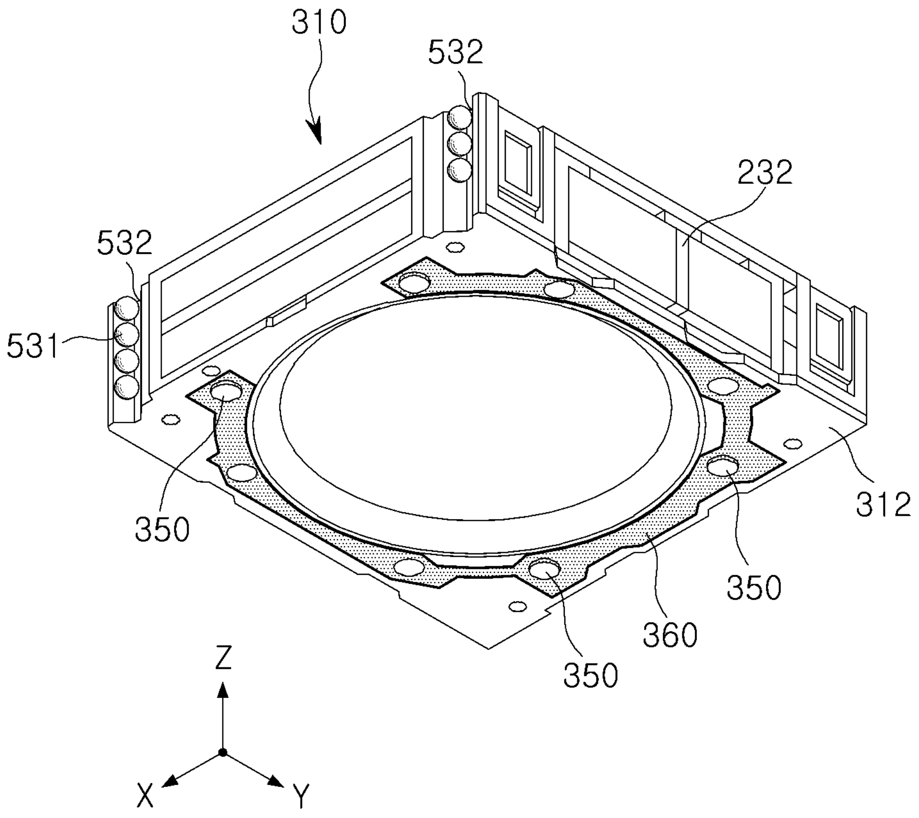
FIG. 10 illustrates a rear perspective view of an AF carrier, in accordance with one or more embodiments.

FIG. 10 illustrates a rear perspective view of an AF carrier, in accordance with one or more embodiments.

In an example, fourth buffer members 350 may be disposed on a lower surface 312 of the AF carrier 310. Referring to FIG. 10 together with FIG. 4, the fourth buffer members 350 may alleviate impact and noise generated when the AF movable body collides with a bottom area 111 of the housing 110 while moving in the −Z-axis direction.

In an example, the fourth buffer members 350 may be provided integrally with the AF carrier 310. That is, the AF carrier 310 may be provided in a manner in which the AF carrier 310 itself includes the fourth buffer members 350 without a separate manufacturing process of assembling the fourth buffer members 350 to the AF carrier 310. In an example, the AF carrier 310 may be manufactured by putting liquid-phase plastic in a mold and curing the liquid-phase plastic. In this example, the plastic may be introduced into the mold in a state in which the fourth buffer members 350 are positioned in the mold, and the fourth buffer members 350 may be firmly fixed to the AF carrier 310 while the plastic hardens.

In an example, the fourth buffer member 350 may be attached to the AF carrier 310 through a second insertion member 360. In an example, after the fourth buffer member 350 is attached to the second insertion member 360, the second insertion member 360 may be positioned in a mold to mold the AF carrier 310. The liquid-phase plastic may at least partially surround the second insertion member 360, and the second insertion member 360 may be firmly fixed to the AF carrier 310 while the plastic hardens.

Referring to FIG. 4, the fourth buffer members 350 may include a plurality of buffer members. In an example, four fourth buffer members 350 may be disposed on the lower surface 312 of the AF carrier 310.

In an example illustrated in FIGS. 2 to 10, it has been illustrated that the camera module 1 includes all of the first buffer members 341, the second buffer members 240, the third buffer members 342, and the fourth buffer members 350, but this is only an example, and in an example, some of the first buffer members 341, the second buffer members 240, the third buffer members 342, or the fourth buffer members 350 may be omitted.

As set forth above, a camera module according to an example may include a unit that alleviates impact or noise due to a collision between a movable body and a fixed body generated at the time of correcting a shake.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:

a carrier;

a lens holder accommodated in the carrier;

an optical image stabilization (OIS) cover coupled to the carrier, and disposed on the lens holder; and first buffer members coupled to the OIS cover, wherein a distance between the lens holder and the first buffer members is less than a distance between the lens holder and the OIS cover, and wherein an air gap is formed in an optical axis direction between the OIS cover and the lens holder when the lens holder is in contact with the first buffer members.

2. The camera module of claim 1, further comprising second buffer members disposed on the lens holder and configured to contact the carrier based on a movement of the lens holder in directions perpendicular to an optical axis.

3. The camera module of claim 2, wherein the carrier comprises sidewalls which face the lens holder in the directions perpendicular to the optical axis, and the second buffer members are disposed between the sidewalls and the lens holder.

4. The camera module of claim 2, wherein the second buffer members are disposed on side surfaces of the lens holder and face sidewalls of the carrier in a first direction perpendicular to the optical axis and in a second direction perpendicular to both the optical axis and the first direction.

5. The camera module of claim 2, wherein the second buffer members are configured to contact the carrier based on a movement of the lens holder in at least one of a first direction perpendicular to the optical axis and a second direction perpendicular to both the optical axis and the first direction.

6. The camera module of claim 2, wherein the lens holder comprises insertion members at least partially inserted in the lens holder, and the second buffer members are disposed on the insertion members.

7. The camera module of claim 1, further comprising:

a housing configured to accommodate the carrier therein;

a shield case, coupled to the housing, and configured to cover an upper portion of the carrier; and third buffer members disposed on the OIS cover and configured to contact the shield case based on a movement of the carrier in an optical axis direction with respect to the housing.

8. The camera module of claim 7, wherein the first buffer member is formed integrally with the third buffer member.

9. The camera module of claim 7, further comprising fourth buffer members disposed on a lower portion of the carrier and configured to contact a bottom of the housing.

10. The camera module of claim 7, further comprising:

an OIS guide disposed between the lens holder and the carrier;

first ball members disposed between the OIS guide and the carrier;

first guide grooves in contact with the first ball members and extending in a first direction perpendicular to an optical axis;

second ball members disposed between the OIS guide and the lens holder; and second guide grooves in contact with the second ball members and extending in a second direction perpendicular to the optical axis and crossing the first direction.

11. The camera module of claim 10, further comprising:

third ball members disposed between the carrier and the housing; and third guide grooves in contact with the third ball members and extending in the optical axis direction.

12. A camera module comprising:

a housing;

a carrier accommodated in the housing and configured to move in an optical axis direction;

a lens holder accommodated in the carrier and configured to move in a first direction perpendicular to an optical axis and in a second direction perpendicular to both the optical axis and the first direction;

a first buffer member disposed on a first side surface of the lens holder and configured to face a first sidewall of the carrier in the first direction; and a second buffer member, separate from the first buffer member, and disposed on a second side surface of the lens holder and configured to face a second sidewall of the carrier in the second direction, wherein a length of the first buffer member in the optical axis direction is less than a length of the first buffer member in the second direction.

13. The camera module of claim 12, wherein the second buffer members are configured to contact the carrier based on a movement of the lens holder in at least one of a first direction perpendicular to the optical axis and a second direction perpendicular to both the optical axis and the first direction.

14. The camera module of claim 12, wherein the lens holder comprises insertion members at least partially inserted in the lens holder, and the second buffer members are disposed on the insertion members.

15. The camera module of claim 12, further comprising:

a shield case coupled to the housing and configured to cover an upper portion of the carrier; and third buffer members configured to contact the shield case based on a movement of the carrier in the optical axis direction with respect to the housing.

16. A camera module, comprising:

a carrier;

an optical image stabilization (OIS) movable body including a lens assembly and a lens holder, and configured to move in an optical axis direction together with the carrier;

an OIS cover; and first dampers disposed on a lower surface of the OIS cover, and configured to protrude toward an upper surface of the OIS movable body;

wherein the OIS movable body is configured to contact the first dampers when the OIS movable body moves toward the OIS cover in the optical axis direction, and wherein an air gap is formed in the optical axis direction between the OIS cover and the OIS movable body when the OIS movable body contacts the first dampers.

17. The camera module of claim 16, further comprising second dampers disposed on side surfaces of the OIS movable body between the OIS movable body and the carrier.

18. The camera module of claim 17, wherein the second dampers are configured to face the carrier in a first direction perpendicular to an optical axis direction and a second direction perpendicular to the optical axis direction.

19. The camera module of claim 12, wherein corners of the lens holder, where adjacent sides of the lens holder meet, are exposed between the first buffer member and the second buffer member.

20. The camera module of claim 12, wherein the first buffer member is integrally connected to the second buffer member by a connection portion, and the first buffer member extends from a first end of the connection member and the second buffer member extends from a second end of the connection member.

* * * * *